United States Patent
Lee (10) Patent No.: US 9,826,573 B2
(45) Date of Patent: Nov. 21, 2017

(54) SIGNAL PROCESSING DEVICE FOR DISTRIBUTED ANTENNA SYSTEM

(71) Applicant: SOLiD, INC., Seongnam-si, Gyeonggi-do (KR)

(72) Inventor: Hwansun Lee, Bucheon-si (KR)

(73) Assignee: SOLiD, INC., Seongnam-Si (KR)

( * ) Notice: Subject to any disclaimer, the term of this patent is extended or adjusted under 35 U.S.C. 154(b) by 0 days.

(21) Appl. No.: 15/395,720

(22) Filed: Dec. 30, 2016

(65) Prior Publication Data
US 2017/0111957 A1    Apr. 20, 2017

Related U.S. Application Data

(63) Continuation-in-part of application No. PCT/KR2015/005130, filed on May 22, 2015.

(51) Int. Cl.
*H04W 88/08* (2009.01)
*H04B 1/40* (2015.01)

(52) U.S. Cl.
CPC ............ *H04W 88/085* (2013.01); *H04B 1/40* (2013.01)

(58) Field of Classification Search
CPC ............................. H04W 88/085; H04B 1/40
USPC .......................................................... 455/561
See application file for complete search history.

(56) References Cited

U.S. PATENT DOCUMENTS

| | | | | |
|---|---|---|---|---|
| 3,001,191 A * | 9/1961 | Richter | ................... | G01S 13/46 342/123 |
| 5,621,786 A * | 4/1997 | Fischer | ............... | H04W 88/085 370/331 |
| 5,627,879 A * | 5/1997 | Russell | ............... | H04W 88/085 370/328 |
| 5,642,405 A * | 6/1997 | Fischer | ............... | H04W 88/085 455/444 |
| 5,644,622 A * | 7/1997 | Russell | ............... | H04W 88/085 370/338 |
| 5,657,374 A * | 8/1997 | Russell | ............... | H04W 88/085 370/328 |
| 5,852,651 A * | 12/1998 | Fischer | ............... | H04W 88/085 379/56.2 |
| 6,157,811 A * | 12/2000 | Dent | ...................... | H01O 1/288 455/12.1 |
| 7,106,246 B1 * | 9/2006 | Lindell | ................. | G01S 13/767 342/175 |
| 8,213,401 B2 * | 7/2012 | Fischer | ............... | H04W 88/085 370/345 |

(Continued)

FOREIGN PATENT DOCUMENTS

| | | |
|---|---|---|
| KR | 10-2008-0071458 A | 8/2008 |
| KR | 10-2010-0021866 A | 2/2010 |

(Continued)

OTHER PUBLICATIONS

International Search Report of PCT/KR2015/005130, dated Apr. 22, 2016. [PCT/ISA/210].

*Primary Examiner* — Hai V Nguyen
(74) *Attorney, Agent, or Firm* — Sughrue Mion, PLLC (57) ABSTRACT

A signal processing device according to an exemplary embodiment of the inventive concept can integrate a power amplifier, a duplexer, and a linearizer as a module to improve the convenience of management and to improve flexibility and extensibility so as to be transformable corresponding to a change in system development concept.

7 Claims, 6 Drawing Sheets

(56) References Cited

U.S. PATENT DOCUMENTS

| | | | | |
|---|---|---|---|---|
| 8,219,145 B2* | 7/2012 | Filipovic | H04B 1/38 | 455/168.1 |
| 8,346,278 B2* | 1/2013 | Wala | G01S 5/0054 | 370/210 |
| 8,526,970 B2* | 9/2013 | Wala | G01S 5/0054 | 370/210 |
| 8,737,454 B2* | 5/2014 | Wala | H04B 1/18 | 375/220 |
| 8,958,410 B2* | 2/2015 | Fischer | H04W 88/085 | 370/345 |
| 9,024,700 B2* | 5/2015 | Ranta | H03J 3/20 | 327/554 |
| 9,247,543 B2* | 1/2016 | Berlin | H04W 72/0453 | |
| 9,270,321 B2* | 2/2016 | Shen | H04B 1/40 | |
| 9,480,160 B2* | 10/2016 | Wimpenny | H03F 1/0227 | |
| 9,525,450 B2* | 12/2016 | Costa | H04B 1/18 | |
| 9,585,193 B2* | 2/2017 | Wala | H04B 1/18 | |
| 9,602,211 B2* | 3/2017 | Yeo | H04B 10/25753 | |
| 2003/0162502 A1* | 8/2003 | Loveridge | H03F 1/3247 | 370/296 |
| 2005/0185726 A1* | 8/2005 | Greszczuk | H04L 12/40006 | 375/260 |
| 2008/0181282 A1* | 7/2008 | Wala | H04B 1/18 | 375/130 |
| 2010/0135368 A1* | 6/2010 | Mehta | H04L 27/38 | 375/219 |
| 2010/0177759 A1* | 7/2010 | Fischer | H04W 88/085 | 370/345 |
| 2010/0178936 A1* | 7/2010 | Wala | G01S 5/0054 | 455/456.2 |
| 2010/0188148 A1* | 7/2010 | Mehta | H03F 1/3247 | 330/149 |
| 2012/0093084 A1* | 4/2012 | Wala | H04B 1/18 | 370/328 |
| 2012/0184228 A1* | 7/2012 | Mujtaba | H04B 1/04 | 455/103 |
| 2012/0263152 A1* | 10/2012 | Fischer | H04W 88/085 | 370/336 |
| 2013/0079035 A1* | 3/2013 | Wala | G01S 5/0054 | 455/456.2 |
| 2013/0130752 A1* | 5/2013 | Zhang | H04B 1/0458 | 455/574 |
| 2014/0155128 A1* | 6/2014 | Dakshinamurthy | H04W 52/0209 | 455/574 |
| 2014/0273891 A1* | 9/2014 | Costa | H04B 1/18 | 455/90.2 |
| 2015/0078422 A1* | 3/2015 | Shen | H04B 1/40 | 375/219 |
| 2015/0295539 A1* | 10/2015 | Tsang | H03F 1/565 | 370/294 |
| 2015/0333781 A1* | 11/2015 | Alon | H04B 1/0475 | 370/277 |
| 2016/0056865 A1* | 2/2016 | Uyehara | H04B 7/024 | 370/329 |
| 2016/0315680 A1* | 10/2016 | Braun | H04B 7/0617 | |
| 2016/0315706 A1* | 10/2016 | Yeo | H04B 10/25753 | |
| 2017/0149505 A1* | 5/2017 | Yeo | H04B 10/25753 | |
| 2017/0170864 A1* | 6/2017 | Wala | H04B 1/40 | |

FOREIGN PATENT DOCUMENTS

| | | |
|---|---|---|
| KR | 10-2011-0011552 A | 2/2011 |
| KR | 10-2014-0112231 A | 9/2014 |

* cited by examiner

SIGNAL PROCESSING DEVICE FOR DISTRIBUTED ANTENNA SYSTEM

CROSS REFERENCE TO RELATED APPLICATION

This application is a Continuation-in-Part of International Application No. PCT/KR2015/005130, filed May 22, 2015, the contents of which are incorporated herein by reference in their entireties.

BACKGROUND

1. Field

The inventive concept relates to a signal processing device. More specifically, the inventive concept relates to a signal processing device that can improve the convenience of management by integrating a power amplifier, a duplexer, and a linearizer as a module and improve flexibility and extensibility so as to be transformable corresponding to a change in system development concept.

2. Description of Related Art

Mobile communication usage of users has been rapidly increased due to development of mobile communication and the users want to stably receive a communication service without the constraints of time and space. However, it is difficult for an operator to smoothly provide the communication service to the users while a shadow area is generated due to a limited output of a base station and a constraint such as the position or a peripheral geographical feature of the base station, and as a scheme for resolving such a problem, a distributed antenna system (DAS) is used.

The DAS is installed in an area in which a radio wave is not received or weakly received, such as the inside of a building, a basement of the building, a subway, a tunnel, an apartment complex of a residential area, a stadium, or the like, to provide the communication service up to the shadow area where a signal of the base station is difficult to reach and extend coverage of the base station, and consists of a headend apparatus that that is communicatively connected with the base station and a plurality of remote apparatus that is connected to the headend apparatus through a optical transport medium and is communicatively connected to a user terminal to process a signal.

In the plurality of remote apparatus of the DAS according to the related art, there are a lot of cases in which a deployment state of a power amplifier, a duplexer, and a linearizer or whether the power amplifier, the duplexer, and the linearizer are provided is decided according to a development concept of the system, and as a result, the system cannot be united and it is thus difficult to manage the plurality of remote apparatus and it is also difficult to efficiently cope with a change in operational environment of the system.

SUMMARY

The inventive concept relates a signal processing device that can improve the convenience of management by integrating a power amplifier, a duplexer, and a linearizer as a module and can also improve flexibility and extensibility so as to be transformable corresponding to a change in system development concept.

According to an exemplary embodiment of the inventive concept, there is provided a signal processing device including: a base module including a power amplifier; a first module coupled to the base module and selectively including an RF processing unit for processing an RF signal; a circuit substrate detachably coupled to the first module and including a linearizer correcting a distortion signal; and a second module covering the first module and including a duplexer separating a transmitted or received RF signal.

An accommodating groove accommodating the circuit substrate may be formed on one surface of the first module.

A first connector transferring a signal processed and introduced by the RF processing unit to the linearizer, and a second connector transferring the signal processed through the linearizer to the power amplifier may be provided on one surface of the first module.

The linearizer may include a pre-distortion device.

The signal processing device may further include a sensing unit provided in the first module to sense whether the circuit substrate is mounted or detached.

The signal processing device may further include a switch unit switching the signal processed by the RF processing unit to be processed by the linearizer and thereafter, transferred to the power amplifier at the time of mounting the circuit substrate according to a detection of whether the circuit substrate is mounted or detached by the sensing unit.

The switch unit may switch the signal introduced into the signal processing device to be bypassed to the power amplifier at the time of separating the circuit substrate according to a detection of whether the circuit substrate is mounted or detached by the sensing unit.

A signal processing device according to an exemplary embodiment of the inventive concept can improve the inconvenience of management by integrating a power amplifier, a duplexer, and a linearizer as a module and easily replacing or separating parts as necessary, and also can improve flexibility and extensibility so as to be transformable corresponding to a change in system development concept.

BRIEF DESCRIPTION OF FIGURES

The above and other aspects, features and advantages of certain exemplary embodiments of the inventive concept will be more apparent from the following description taken in conjunction with the accompanying drawings, in which.

DETAILED DESCRIPTION OF EXEMPLARY EMBODIMENTS

The inventive concept may have various modifications and various exemplary embodiments and specific exemplary embodiments will be illustrated in the drawings and described in detail through the detailed description. However, this is not intended to limit the inventive concept to the specific exemplary embodiments, and it should be understood that the inventive concept covers all the modifications, equivalents and replacements included in the spirit and technical scope of the inventive concept.

In describing the inventive concept, when it is determined that the detailed description of the publicly known art related to the inventive concept may unnecessarily obscure the gist of the inventive concept, the detailed description thereof will be omitted. Further, numerical figures (for example, first, second, and the like) used during describing the specification are just identification symbols for differentiating one component from other components.

Further, in the specification, when it is mentioned that one element is "connected with" or "accesses" the other element, the one element may be directly connected with or directly accesses the other element, but if there is a not particularly contrary description, it should be appreciated that both elements may be connected with or accesses each other with another element intervening therebetween.

In addition, a term "~part (unit)", ~er", "~or", "~module", or the like, described in the specification means a unit of processing at least one function or operation and may be implemented by hardware or software or a combination of hardware and software.

In addition, it will be apparent that in the specification, components are just classified for each main function which each component takes charge of. That is, two or more components to be described below may be provided to be combined into one component or one component may be provided to be separated into two or more for each of more subdivided functions. In addition, each of the components to be described below may additionally perform some or all functions among functions which other components take charge of in addition to the main function which each component takes charge of, and some functions among the main functions which the respective components take charge of may be exclusively charged and performed by other components, of course.

A distributed antenna system means a coverage system for an in-building service that transfers voice communication and data communication with high quality for seamlessly accessing and means a system for servicing an analog and digital telephone system which is serviced in multiple bands through at least one antenna. Further, the distributed antenna system may enhance a poor radio wave environment in building and enhance a poor received signal strength indication (RSSI) and chip energy/others interference (Ec/Io) which is total receiving sensitivity of a mobile terminal.

Meanwhile, a distributed antenna system using a signal processing device according to an exemplary embodiment may support a mobile communication standard which is used worldwide. For example, the distributed antenna system may support frequencies such as a very high frequency (VHF), an ultra high frequency (UHF), 700 MHz, 800 MHz, 850 MHz, 900 MHz, 1900 MHz, 2100 MHz band, 2600 MHz band, and the like, and an FDD-scheme service and a TDD-scheme service. In addition, the distributed antenna system may support an advanced mobile phone service (AMPS) which is a representative of analog and multiple mobile communication standards such as Time-Division Multiplexing Access (TDMA), Code Division Multiple Access (CDMA), Wideband Code Division Multiple Access (WCDMA), High Speed Downlink Packet Access (HSDPA), Long Term Evolution (LTE), Long Term Evolution Advanced (LTE-A), and the like of digital.

Hereinafter, exemplary embodiments of the inventive concept will be described in detail with reference to the accompanying drawings.

Figure 1:
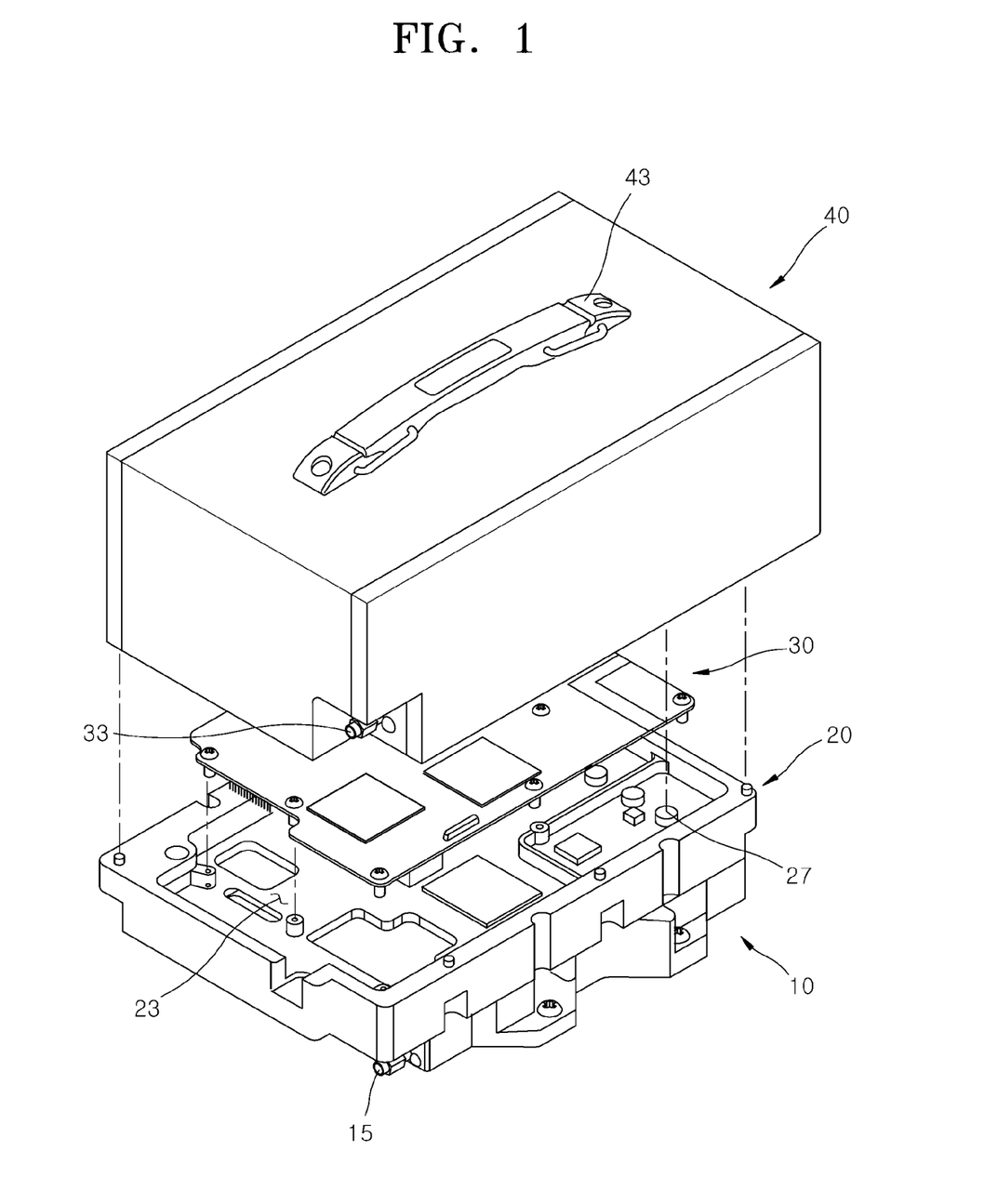
FIG. 1 is an exploded perspective view of a signal processing device according to an exemplary embodiment of the inventive concept.
Figure 2:
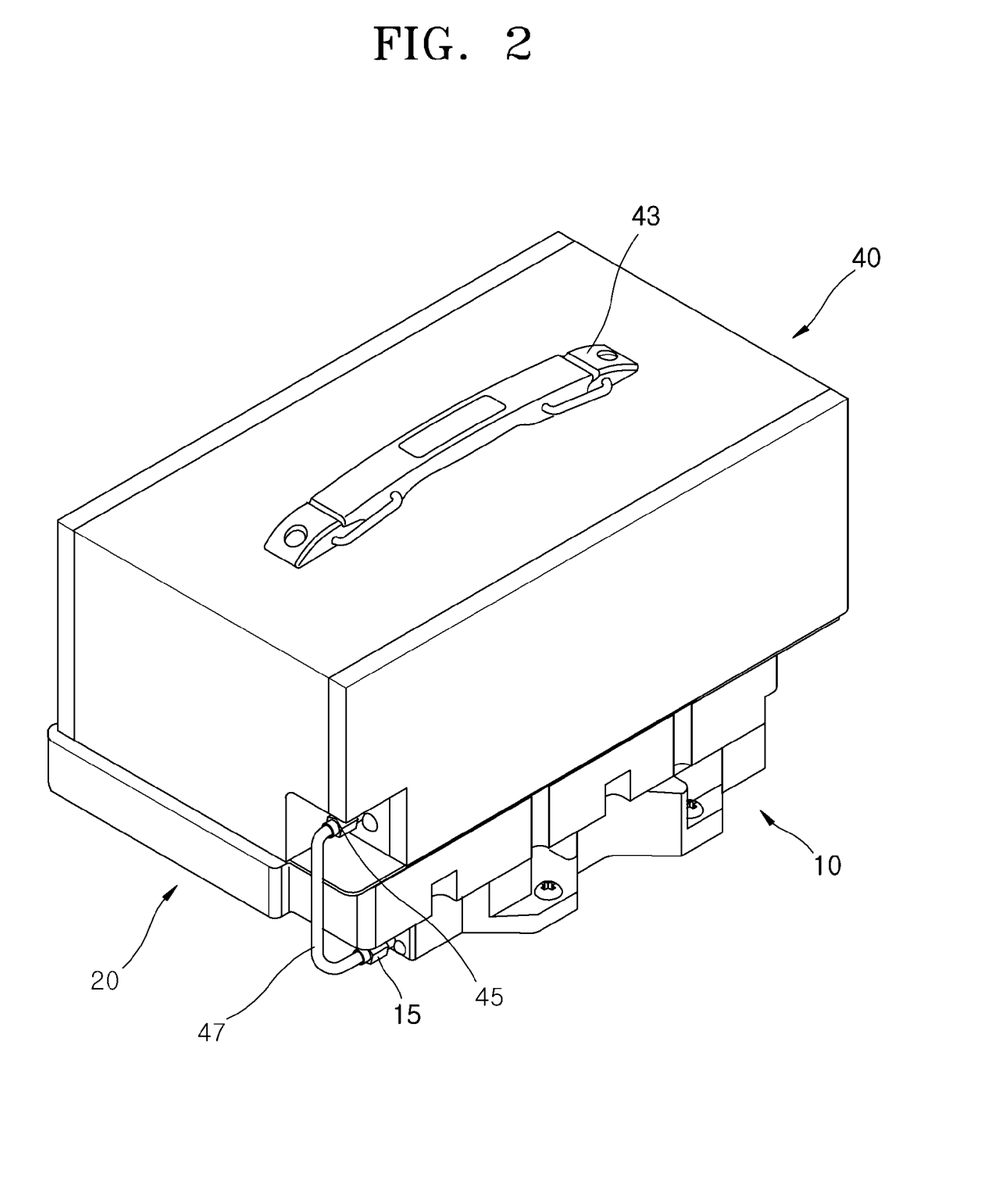
FIG. 2 is a perspective view of the signal processing device according to the exemplary embodiment of the inventive concept.
Figure 3:
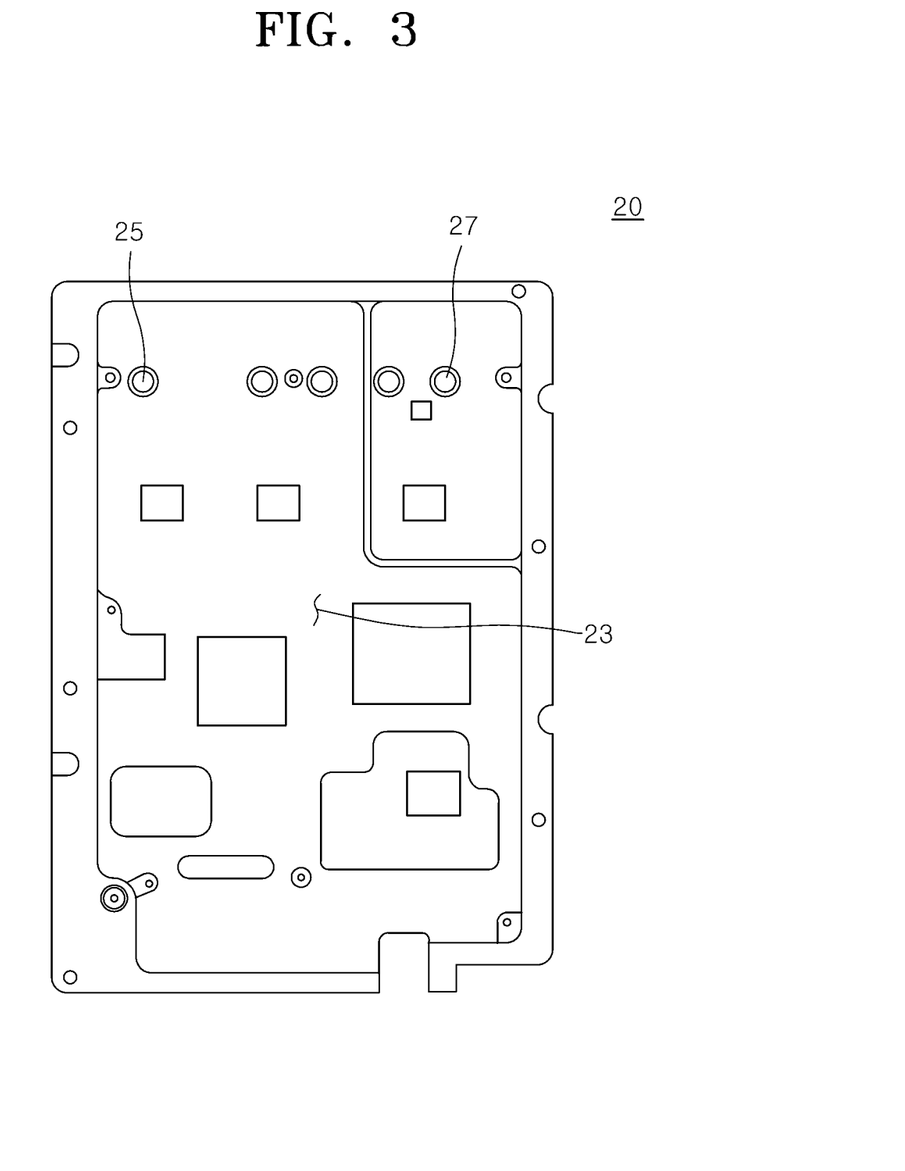
FIG. 3 is a diagram schematically illustrating a first module of the signal processing device according to the exemplary embodiment of the inventive concept.
Figure 4:
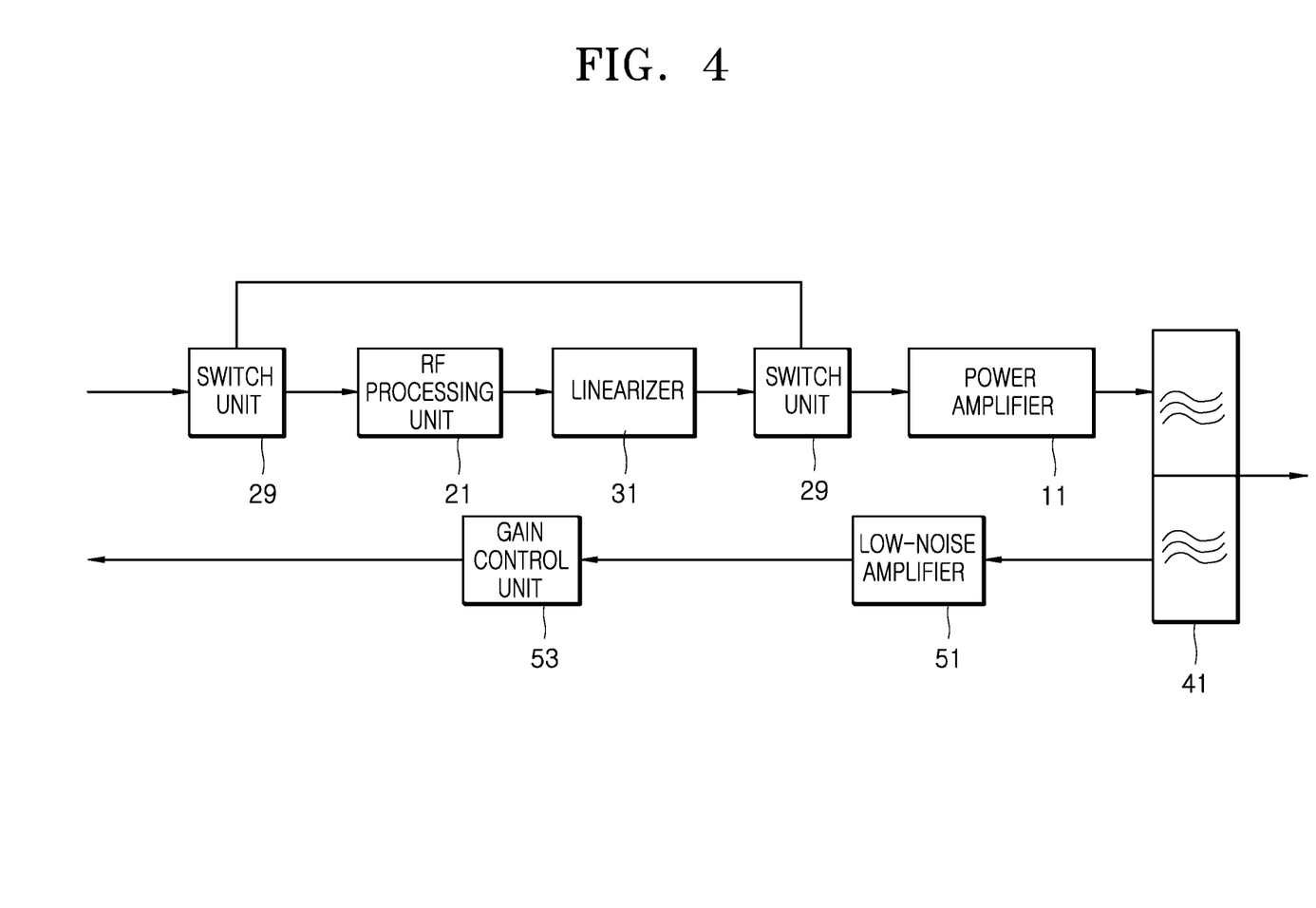
FIGS. 4 to 6 are usage state diagrams to which the signal processing device according to the exemplary embodiment of the inventive concept is applied.
Figure 5:
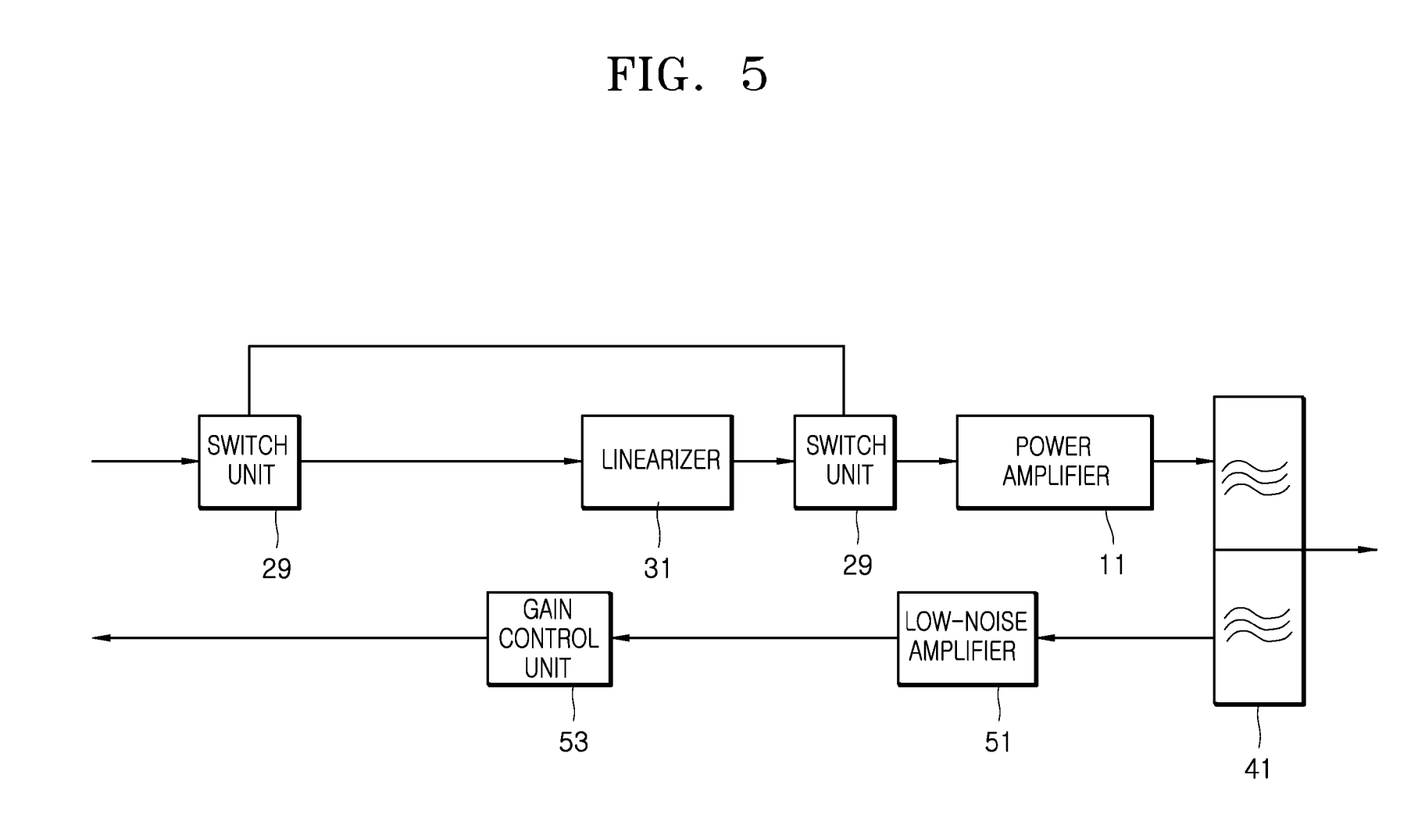
Figure 6:
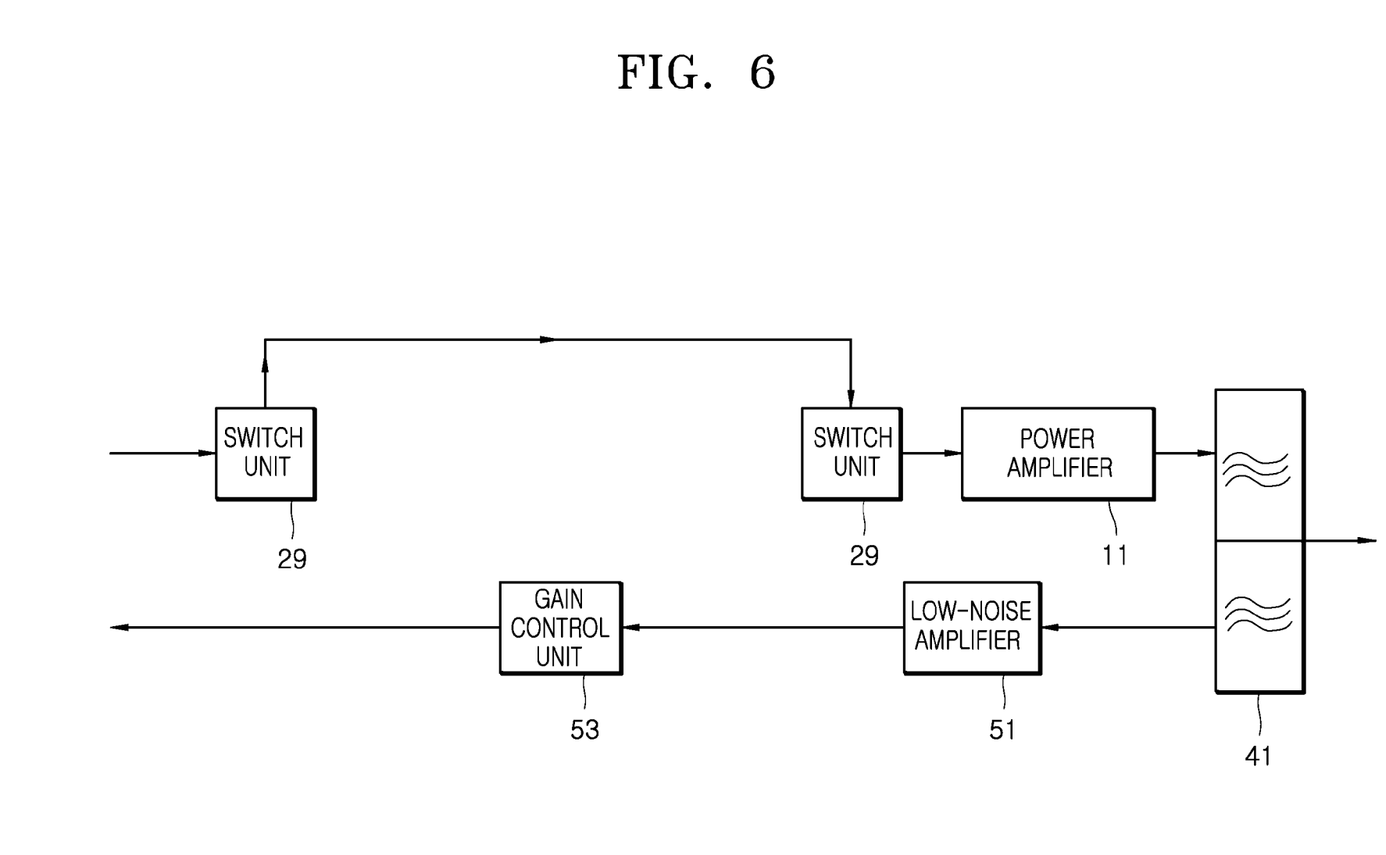

FIG. 1 is an exploded perspective view of a signal processing device according to an exemplary embodiment of the inventive concept. FIG. 2 is a perspective view of the signal processing device according to the exemplary embodiment of the inventive concept. FIG. 3 is a diagram schematically illustrating a first module of the signal processing device according to the exemplary embodiment of the inventive concept. FIGS. 4 to 6 are usage state diagrams to which the signal processing device according to the exemplary embodiment of the inventive concept is applied.

In FIGS. 1 to 6, a base module 10, a power amplifier 11, a first terminal 15, a first module 20, an RF processing unit 21, a accommodating groove 23, a first connector 25, a second connector 27, a switch unit 29, a circuit substrate 30, a linearizer 31, a second module 40, a duplexer 41, a handle 43, a second terminal 45, a connection line 47, a low-noise amplifier 51, and a gain control unit 53 are illustrated.

Referring to FIG. 1, the signal processing device according to the exemplary embodiment includes: a base module 10 including the power amplifier 11; a first module 20 coupled to the base module 10 and selectively including the RF processing unit 21 for processing an RF signal; a circuit substrate 30 detachably coupled to the first module 20 and including the linearizer 31 compensating a distortion signal; and a second module 40 covering the first module 20 and including the duplexer 41 separating a transmitted or received RF signal to improve the convenience of management by integrating the power amplifier 11, the duplexer 41, and the linearizer 31 as a module and to improve flexibility and extensibility so as to be transformable corresponding to a change in system development concept.

A distributed antenna system (DAS) may include a head-end apparatus (not illustrated), which is communicatively coupled to a base station and constitutes a headend node, and a hub apparatus serving as an extension node, and a plurality of remote apparatus respectively disposed at remote service location. The distributed antenna system (DAS) may be implemented as an analog distributed antenna system. However, the technical spirit of the inventive concept is not limited thereto. The distributed antenna system (DAS) may be implemented as a digital distributed antenna system and in some cases, implemented as a mixed type (for example, some nodes perform analog processing and residual nodes perform digital processing) thereof. The signal processing device according to an exemplary embodiment of the inventive concept may be mounted in at least one of the remote apparatus for processing a signal having a predetermined frequency band. According to one or more implementations, if the distributed antenna system (DAS) has employed a neutral host architecture to integrally support various services (e.g., multi-band services, multi-carrier services, etc.) or services of a plurality of providers, a plurality of the signal processing device may be mounted in the remote apparatus for a predetermined frequency band.

The signal processing device according to the exemplary embodiment may include a base module 10, the first module 20, the circuit substrate 30, and the second module 40.

The base module 10 may be coupled to the first module 20 to be described below and may include the power amplifier 11. The power amplifier 11 may amplify a transmission signal to transmit the amplified transmission signal to the duplexer 41 to be described below.

The first module 20 may be coupled to the base module 10 and may selectively include the RF processing unit 21. The first module 20 may be coupled to the top of the base module 10 and may selectively include the RF processing unit 21 for processing a radio frequency (RF) signal. In the exemplary embodiment, it is described that the base module 10 and the first module 20 are configured as separate parts, respectively and the first module 20 is coupled to the top of the base module 10, but the base module 10 and the first module 20 are formed as one component, and as a result, the power amplifier 11 and the RF processing unit 21 may be provided therein.

The RF processing unit 21 may be selectively provided in the first module 20. That is, when it is determined that the RF processing unit 21 is required according to a system development concept, the RF processing unit 21 may be provided in the first module 20 and, when the RF processing unit 21 is not required or a separate RF processing unit 21 is provided outside the signal processing device, the RF processing unit 21 may not be provided in the first module 20. The RF processing unit 21 which is used to process a transmitted RF signal may be an RF-IF conversion device that converts the RF signal into an intermediate frequency (IF) signal. In general, since the RF signal transmitted from the base station is a high-power signal, the RF signal is converted into a signal having appropriate power through the RF processing unit 21. However, when the RF processing unit 21 is a component that may process the RF signal, the RF processing unit 21 may be configured in various schemes.

Meanwhile, the low-noise amplifier (LNA) 51 and the gain control unit (gain block) 53 used in a reverse-direction link may be provided in the first module 20. Noise of a signal transferred through the duplexer 41 may be removed and power of the signal may be controlled while passing through the low-noise amplifier 51 and the gain control unit 53 to be output to the outside of the signal processing device (see FIGS. 4 to 6).

The circuit substrate 30 may be detachably coupled to the first module 20 and may include the linearizer 31 that compensates a distortion signal. The circuit substrate 30 may be detachably coupled to the top of the first module 20 and mounted on the signal processing device as necessary. The linearizer 31 may be provided in the circuit substrate 30 to correct and linearize the distortion signal. The linearizer 31 may include a pre-distortion device. In this case, the pre-distortion device may be an analog pre-distortion (APD) device or a digital pre-distortion (DPD) device.

In detail, when the circuit substrate 30 is mounted on the signal processing device, the signal processed by the RF processing unit 21 is transmitted to the linearizer 31 of the circuit substrate 30 and the transmitted signal is compensated by the linearizer 31 and transmitted to the power amplifier 11. On the contrary, when the linearizer 31 is not required and the circuit substrate 30 including the linearizer 31 is not mounted on the signal processing device according to the system concept, the signal introduced into the signal processing device is transmitted to the power amplifier 11. Further, since an external input signal is an IF signal, when a separate RF-IF conversion device is not required in the signal processing device, the RF processing unit 21 may not be provided in the first module 20. As such, in the signal processing device according to the exemplary embodiment, since the circuit substrate 30 including the linearizer 31 may be mounted/detached according to the system development concept, flexibility and extensibility may be improved as the signal processing device.

The second module 40 may cover the first module 20 and the second module 40 may include the duplexer 41 that separates the transmitted or received RF signal. The handle 43 is provided on the top of the second module 40 to facilitate transportation or installation of the integrated signal processing device. Meanwhile, a first terminal 15 may be formed at one side of the base module 10 and a second terminal 45 may be formed at one side of the second module 40, and the first terminal 15 and the second terminal 45 may be connected by the connection line 47.

As such, the power amplifier 11, the duplexer 41, the linearizer 31, and the RF processing unit 21 may be integrated as the module, and parts may easily be replaced and detached as necessary to improve the convenience of management.

The accommodating groove 23 accommodating the circuit substrate 30 may be formed on one surface of the first module 20. The accommodating groove 23 may be formed on the top of the first module 20 so as to correspond to the circuit substrate 30, and the circuit substrate 30 may be inserted into the accommodating groove 23 to be provided in the signal processing device integrally with the first module 20.

In this case, a first connector 25 and a second connector 27 may be formed on one surface of the first module 20.

Referring to FIG. 3, the first connector 25 is formed on one surface of the first module 20, and as a result, the signal processed and introduced by the RF processing unit 21 is transferred to the linearizer 31. The second connector 27 is formed on one surface of the first module 20 to be separated from the first connector 25 to transfer the signal processed through the linearizer 31 to the power amplifier 11.

Meanwhile, the signal processing device according to the exemplary embodiment may further include a sensing unit provided in the first module 20 to sense whether the circuit substrate 30 is detachable. The sensing unit may determine whether the circuit substrate 30 is mounted or detached according to whether the circuit substrate 30 contacts the first module 20. The sensing unit is provided in the first module 20 and actuates the switch unit 29 to be described below by detecting whether the circuit substrate 30 is mounted or detached to control the signal introduced into the first module 20.

The switch unit 29 may switch the signal processed by the RF processing unit 21 to be processed by the linearizer 31 and thereafter, transferred to the power amplifier 11 at the time of mounting the circuit substrate 30 according to a detection of whether the circuit substrate 30 is mounted or detached. Further, the switch unit 29 may switch the signal introduced into the signal processing device to be bypassed to the power amplifier 11 at the time of separating the circuit substrate 30 according to a detection of whether the circuit substrate 30 is mounted or detached. In detail, when the circuit substrate 30 is mounted, the signal processed by the RF processing unit 21 is introduced into the linearizer 31 of the circuit substrate 30 through the first connector 25 and the signal processed by the linearizer 31 is transferred to the power amplifier 11 through the second connector 27. Meanwhile, when the sensing unit senses that the circuit substrate 30 is detached from the first module 20, the switch unit 29 operates to bypass the input signal introduced into the signal processing device and transfer the bypassed input signal to the power amplifier 11.

FIGS. 4 to 6 are usage state diagrams to which the signal processing device according to the exemplary embodiment of the inventive concept is applied.

Referring to FIG. 4, the exemplary embodiment shows a case in which the RF processing unit 21 and the linearizer 31 are required in the signal processing device according to the system concept, the RF processing unit 21 is provided in the first module 20, and the circuit substrate 30 including the linearizer 31 is mounted on the top of the first module 20. The signal introduced into the RF processing unit 21 is subjected to signal processing such as frequency conversion by the RF processing unit 21 to be transferred to the linearizer 31. The signal transferred to the linearizer 31 is compensated by the linearizer 31 and transferred to the power amplifier 11. The signal transferred to the power amplifier 11 is amplified by the power amplifier 11 and thereafter, transferred to an antenna (not illustrated) through the duplexer 41. In this case, the RF processing unit 21 may be an RF-IF conversion device for converting the RF signal into the IF signal and the linearizer 31 may be a linearizer including the pre-distortion device for correcting the converted IF signal.

Referring to FIG. 5, the exemplary embodiment shows a case in which the linearizer 31 not including the pre-distortion device is required in the signal processing device according to the system concept, and the RF processing unit 21 is not provided in the first module 20 and the circuit substrate 30 including the linearizer 31 is mounted on the top of the first module 20. The input signal is transferred to the linearizer 31 and the signal transferred to the linearizer 31 is corrected and transferred to the power amplifier 11. The signal transferred to the power amplifier 11 is amplified by the power amplifier 11 and thereafter, transferred to an antenna (not illustrated) through the duplexer 41.

Referring to FIG. 6, an exemplary embodiment shows a case in which the linearizer 31 is not required in the signal processing device according to the system concept and the RF processing unit 21 is not provided in the first module 20 and the linearizer 31 is not also provided. The sensing unit determines whether the circuit substrate 30 is separated from the first module 20 according to whether the circuit substrate 30 contacts the first module 20 and the switch unit 29 switches the signal to bypass the input signal introduced into the signal processing device to the power amplifier 11.

As described above, the signal processing device according to the exemplary embodiment may integrate the power amplifier 11, the duplexer 41, and the linearizer 31 as the module to improve the convenience of the management and improve the flexibility and extensibility so as to be transformable corresponding to the change in system development concept.

Hereinabove, the inventive concept has been described in detail with reference to the preferred embodiment, but the inventive concept is not limited to the embodiment and various modifications and changes may be made by those skilled in the art within the technical spirit and scope of the inventive concept.

What is claimed is:

1. A signal processing device comprising:
 a base module including a power amplifier;
 a first module coupled to the base module and selectively including an RF processing unit for processing an RF signal;
 a circuit substrate detachably coupled to the first module and including a linearizer correcting a distortion signal; and
 a second module covering the first module and including a duplexer separating a transmitted or received RF signal.

2. The signal processing device of claim 1, wherein an accommodating groove accommodating the circuit substrate is formed on one surface of the first module.

3. The signal processing device of claim 1, wherein a first connector transferring a signal processed and introduced by the RF processing unit to the linearizer, and a second connector transferring the signal processed through the linearizer to the power amplifier are provided on one surface of the first module.

4. The signal processing device of claim 1, wherein the linearizer includes a pre-distortion device.

5. The signal processing device of claim 1, further comprising:
 a sensing unit provided in the first module to sense whether the circuit substrate is mounted or detached.

6. The signal processing device of claim 5, further comprising:
 a switch unit switching the signal processed by the RF processing unit to be processed by the linearizer and thereafter, transferred to the power amplifier at the time of mounting the circuit substrate according to a detection of whether the circuit substrate is mounted or detached by the sensing unit.

7. The signal processing device of claim 5, wherein the switch unit switches the signal introduced into the signal processing device so as to be bypassed to the power amplifier at the time of detaching the circuit substrate according to a detection of whether the circuit substrate is mounted or detached by the sensing unit.

* * * * *